United States Patent

Knutson et al.

[11] Patent Number: 5,941,090
[45] Date of Patent: Aug. 24, 1999

[54] THERMAL JACKET FOR PRESSURIZED CONTAINERS

[75] Inventors: Paul L. Knutson; Danny R. Oldham; Nathan Desatnik, all of San Antonio, Tex.

[73] Assignees: Sony Corporation of Japan, Tokyo, Japan; Sony Electronics, Inc., Park Ridge, N.J.

[21] Appl. No.: 09/054,974

[22] Filed: Apr. 3, 1998

[51] Int. Cl.⁶ .......................... F25D 15/00; G01G 19/00; F28F 7/00
[52] U.S. Cl. .............................. 62/331; 165/138; 177/245
[58] Field of Search ............................... 62/331, 371, 62, 62/237, 378, 516, 518; 177/143, 180, 245; 165/80.1, 80.5, 138

[56] References Cited

U.S. PATENT DOCUMENTS

| | | | |
|---|---|---|---|
| 2,594,603 | 4/1952 | Zamboni | 62/331 |
| 4,691,793 | 9/1987 | Kumakura et al. | 177/50 |
| 5,217,082 | 6/1993 | Serra-Tosio et al. | 177/147 |
| 5,484,204 | 1/1996 | Damley | 374/10 |
| 5,837,944 | 11/1998 | Herot | 177/245 |

*Primary Examiner*—William Doerrler
*Attorney, Agent, or Firm*—Wagner Murabito & Hao

[57] ABSTRACT

A temperature control system for controlling the temperature of chemicals disposed in bottles. The temperature control system includes a temperature control device that controls the temperature of a liquid. The liquid circulates through a jacket. A bottle may easily be placed into the jacket such that the bottle sits on a weighing device. The circulation of fluid through the jacket and the temperature control device allows for the temperature of the bottle to be controlled. A bottle retainer that is attached to the jacket by a floating coupling mechanism attaches to the bottle. An emergency shut-off device is then coupled to the bottle. The floating coupling mechanism prevents the rotation of the bottle during operation of the emergency shut-off device. The floating coupling mechanism allows the bottle to float within the jacket such that the weight of the bottle may be determined. This allows for the amount of chemicals in the bottle to be determined accurately.

20 Claims, 5 Drawing Sheets

THERMAL JACKET FOR PRESSURIZED CONTAINERS

TECHNICAL FIELD

This invention relates to pressurized containment systems for storing chemicals. More particularly, the present invention relates to a system for controlling the temperature of bottles that contain pressurized chemicals.

BACKGROUND ART

Chemicals that are used in the manufacture of semiconductor devices must be maintained at specific pressures and temperatures. In particular, chemicals used for Chemical Vapor Deposition (CVD) processes must be maintained at predetermined conditions. One chemical that is commonly used to form metal tungsten layers using CVD processes is tungsten hexafluoride (WF6). As the tungsten hexafluoride is fed to the CVD chamber, it expands and heats such that it becomes a gas. The temperature and pressure under which a chemical is injected into the CVD chamber are critical to the success of the CVD process. That is, unless the conditions such as temperature and pressure are maintained at the proper levels, failure of the CVD process will result. In addition, the chemical must also be stored at a specific temperature and pressure.

Prior art methods for storing and supplying a chemical to a CVD process typically involves the use of a cylindrical metal bottle to house the chemical. The bottle of chemical is typically placed within a jacket formed by serpentine tubes that run up and down the length of the jacket so as to form a cylindrical enclosure. The bottle is then strapped into the jacket. The jacket is then secured to the back of a gas cabinet. Typically, metal straps are used to rigidly secure the jacket to the back of the gas cabinet.

However, securing the bottle to the jacket makes it rather difficult to monitor the amount of chemical in the bottle since the jacket is attached to the gas cabinet. It is important to monitor the amount of chemical remaining in the bottle in order to ensure that the proper amount of chemical is being delivered to the CVD chamber. It is also important to have accurate, up-to-date information on the exact amount of chemical remaining in the bottle in order to guarantee that there will always be enough chemicals on hand so that the entire CVD processes can successfully be completed. Unless a sufficient amount of chemical remains in the bottle to complete a particular batch of semiconductor wafers, the CVD process may terminate prematurely. In addition, bottles must be removed before the bottle is completely empty (typically at a weight of one pound of chemicals) to prevent unwanted byproducts that may have settled to the bottom of the bottle from being introduced into the CVD process. Premature termination of the CVD process and unwanted byproducts result in semiconductor wafers that are defective and must be thrown away. The entire CVD process must then begin anew, resulting in wasted time and money. Thus, it is important to know the amount of chemical remains in the bottle. Knowledge of the amount of chemical remaining in a bottle is also important for inventory control purposes. More particularly, such knowledge allows an operator to order a new bottle when the amount of chemical in the bottle is low.

Prior art methods for determining the amount of chemical remaining in the bottle involve the use of a scale that is either placed on the floor of the gas cabinet, or is attached to the wall of the gas cabinet a short distance above the floor. When the bottle is place within the jacket, the bottle rests on the scale. However, the attachment of the bottle to the jacket results in the inability to accurately determine the weight of the bottle. This is due to the fact that the jacket is secured to the back of the cabinet. Thus, any determination of weight is inexact.

Further complicating matters is the fact that shut-off systems are attached to the gas bottle for shutting off the flow of chemicals in an emergency. Typically, the shut-off system will include a pneumatic valve that automatically shuts off the flow of chemicals in an emergency. However, in order for the pneumatic valve to work, the bottle must be secured such that it will not rotate. Thus, it is quite important to tightly strap the bottle to the jacket so as to assure that the shut-off system will properly work. Again, this makes it very difficult to accurately measure its weight.

Another problem with this type of prior art system is the time it takes to attach and remove bottles. It takes a significant amount of time to strap a bottle to the jacket. Similarly, unstrapping a bottle from the jacket is time consuming. Thus, the process of replacing bottles is time consuming.

A method and apparatus for storing a bottle of chemical to be used in a CVD process that maintains the chemical at a desired temperature and pressure is needed. In addition, a method and apparatus that allows for the accurate determination of weight is needed. Furthermore, a method and apparatus that will allow for bottles to be easily installed and replaced is needed. The present invention provides a unique, novel, and effective solution that meets all of these needs.

DISCLOSURE OF THE INVENTION

The present invention provides a method and apparatus for controlling the temperature of a bottle containing a chemical while allowing the bottle to be weighed such that the amount of chemical remaining in the bottle may be easily determined.

A temperature control system that is adapted to hold a bottle containing a chemical over a weighing device is disclosed. In one embodiment of the present invention, the temperature control system includes a jacket and a temperature control mechanism for controlling the temperature of bottles disposed within the jacket. In one embodiment, the jacket is coupled to a structural support such as a frame, or a wall.

In one embodiment of the present invention, the temperature control mechanism includes channels dispose within the jacket that couple to a temperature control device. A liquid circulates through the temperature control device and through the jacket. The temperature control device heats and/or cools the liquid, as necessary, to maintain the desired temperature.

The temperature control system also includes a bottle retainer and a floating coupling mechanism. The bottle retainer is adapted to couple to a bottle. The floating coupling mechanism couples the bottle retainer to the jacket. In one embodiment of the present invention, the floating coupling mechanism includes a plurality of openings that extend through the bottle retainer and corresponding pins that are coupled to the jacket. The pins extend into the openings such that the bottle retainer floats relative to the jacket.

A bottle containing a chemical to be used in the CVD process is installed into the jacket such that it sits on a weighing device. The bottle is attached to the bottle retainer. The bottle is then coupled to the CVD chamber by an assembly that includes an emergency shut-off system.

Because the jacket is not attached to the bottle as in prior art temperature control devices, the weight of the bottle may be determined by the weighing device. In addition, the floating coupling mechanism allows for the operation of the emergency shut-off system since the bottle retainer prevents the rotation of the bottle.

These and other objects and advantages of the present invention will no doubt become obvious to those of ordinary skill in the art after having read the following detailed description of the preferred embodiments that are illustrated in the various drawing figures.

BRIEF DESCRIPTION OF THE DRAWINGS

The accompanying drawings, that are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of that are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail so as not to unnecessarily obscure aspects of the present invention.

Figure 1:
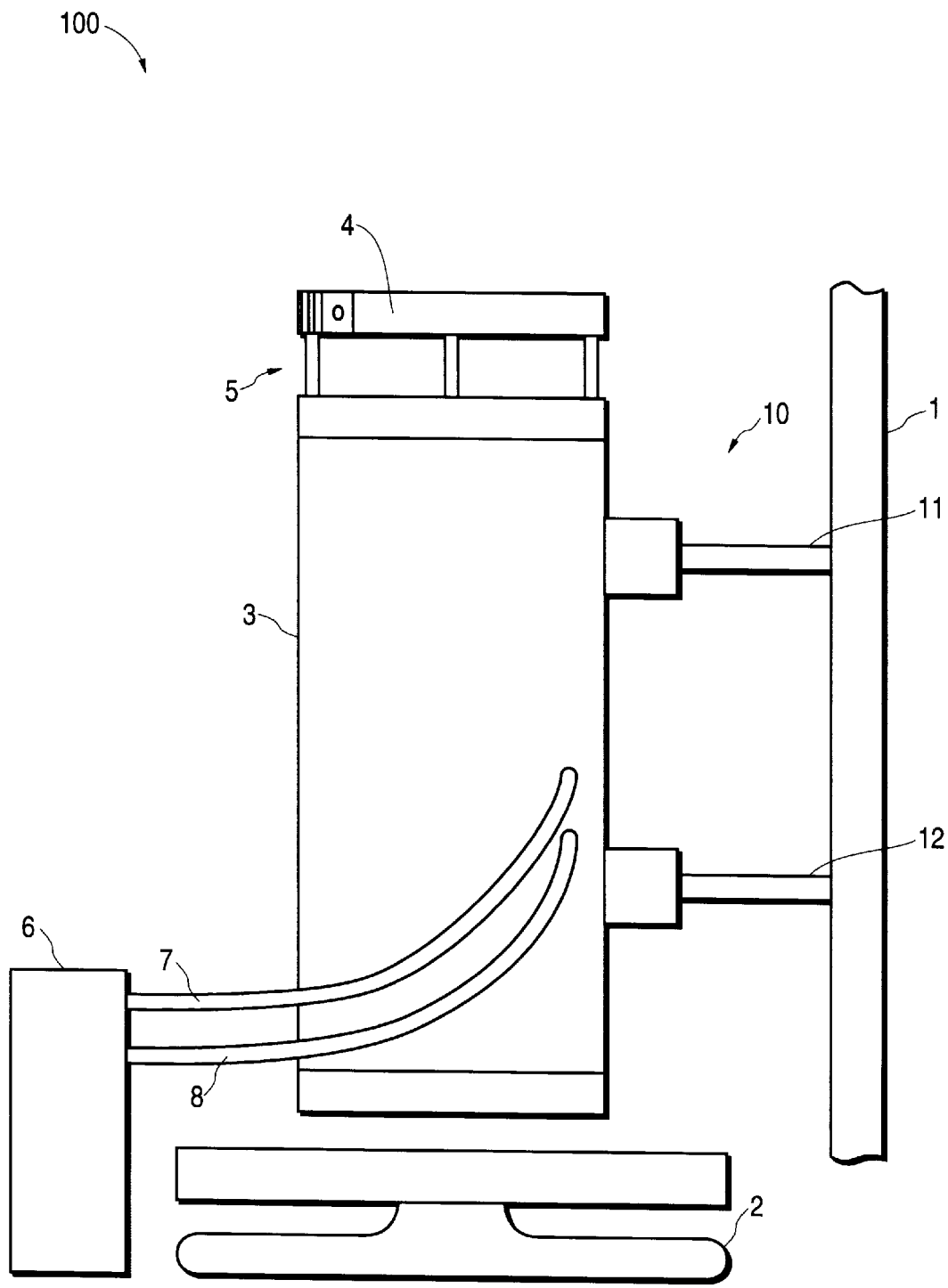
FIG. 1 shows a perspective view of a temperature control system in accordance with the present invention.

FIG. 1 shows, temperature control system 100 to include jacket 3 and bottle retainer 4. Temperature control system 100 also includes a floating coupling mechanism 5 that couples bottle retainer 4 to jacket 3, and an attachment mechanism 10 for holding jacket 3 in place over weighing device 2. In one embodiment, weighing device 2 is a digital scale that sits directly on the floor. Alternatively, other types of weighing devices may be used that attach to cabinet wall 1. In one embodiment, attachment mechanism 10 includes screws 11–14 (screws 13–14 are not shown) that screw into cabinet wall 1. Alternatively, any number of different types of attachment mechanisms that could hold the temperature control device 100 securely in place could be used.

Temperature control system 100 also includes temperature control device 6 that couples to jacket 3 by hoses 7–8.

In one embodiment, temperature control device 6 is a unit that heats and/or cools a liquid. The liquid is circulated between temperature control device 6 and jacket 3 via hoses 7–8. In one embodiment, water is used as a coolant. Alternatively, other liquids such as freon could be used as a coolant.

Figure 2:
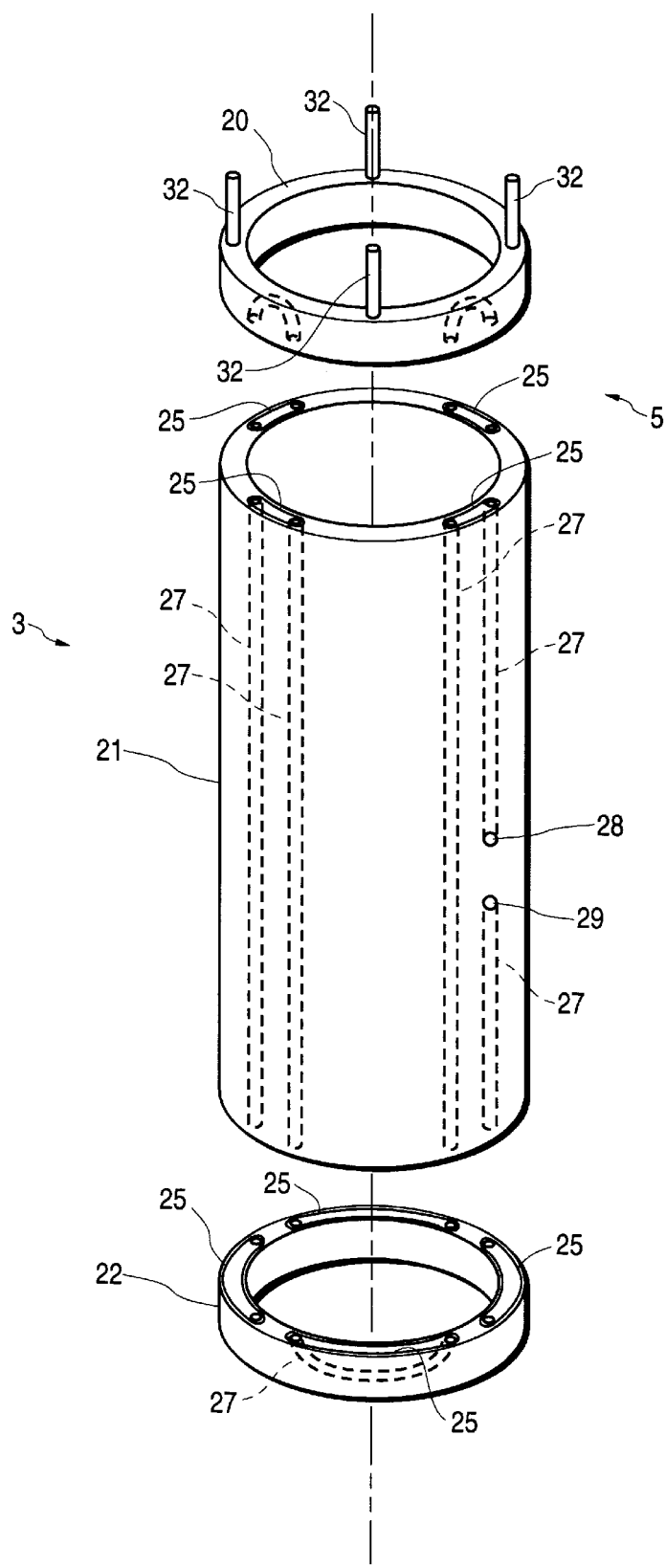
FIG. 2 is an expanded view of a jacket in accordance with the present claimed invention.

Referring now to FIG. 2, jacket 3 is shown to include upper end cap 20, jacket body 21, and a lower end cap 22. Opening 28 and opening 29 connect with channels 27 that run through jacket 3. More particularly, channels 27 extend through jacket body 21 and through upper end cap 20, and through lower end cap 22 such that coolant circulates from opening 28 to opening 29. In one embodiment, jacket 3 is an aluminum cylinder with a 1.159 inch wall thickness and a 6.682 inch internal diameter. The wall thickness of jacket 3 is sufficient so as to give jacket 3 a high thermal mass that results in temperature stability. In one embodiment, channels 27 are formed by eight 0.375 inch diameter holes that extend through jacket body 21. Corresponding openings within upper end cap 20 and lower end cap 22 connect adjoining openings that extend through jacket body 21. O-rings 25 seal the upper end cap 20 and the lower end cap 22 to the jacket body 21.

By providing fewer or more holes and channels through jacket body 21, heating and cooling transfer rate may be optimized. In an alternate embodiment (not shown), twelve holes and corresponding channels extend through jacket body 21. In addition any of a number of different seal designs may be used to form a seal. In one alternate embodiment (not shown) a flat gasket is used to seal the upper end cap and the lower end cap to the jacket body. When a flat gasket is used, holes are cut into the gasket to allow for the desired fluid flow.

Figure 3:
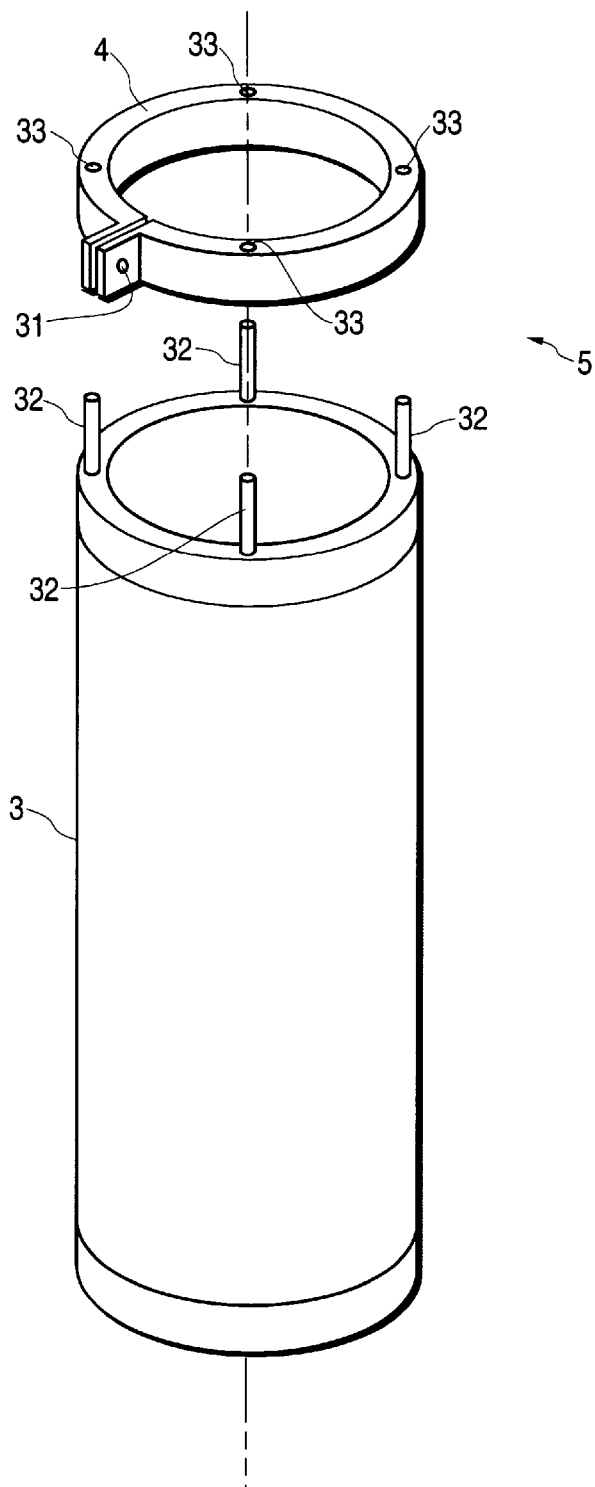
FIG. 3 is an expanded view of a jacket that is coupled to a bottle retainer in accordance with the present claimed invention.

Now referring to FIG. 3, it can be seen that bottle retainer 4 is partially split with bolt 31 connecting opposite sides of bottle retainer 4 at the split. In one embodiment, bottle retainer 4 is machined out of aluminum and has an internal diameter of 6.657 inches. By operating bolt 31, the internal diameter of bottle retainer 4 may be adjusted. Alternatively other mechanisms for attaching a bottle retainer to a bottle may be used such as screws that directly engage the bottle.

Referring still to FIG. 3, floating coupling mechanism 5 is shown to include pins 32 that engage openings 33 in bottle retainer 4. In one embodiment, four pins are used that engage four corresponding openings 33 in bottle retainer 4. In one embodiment, bottle retainer 4 floats at a distance of ⅜ths inch to ½ inch above jacket 3.

Figure 4:
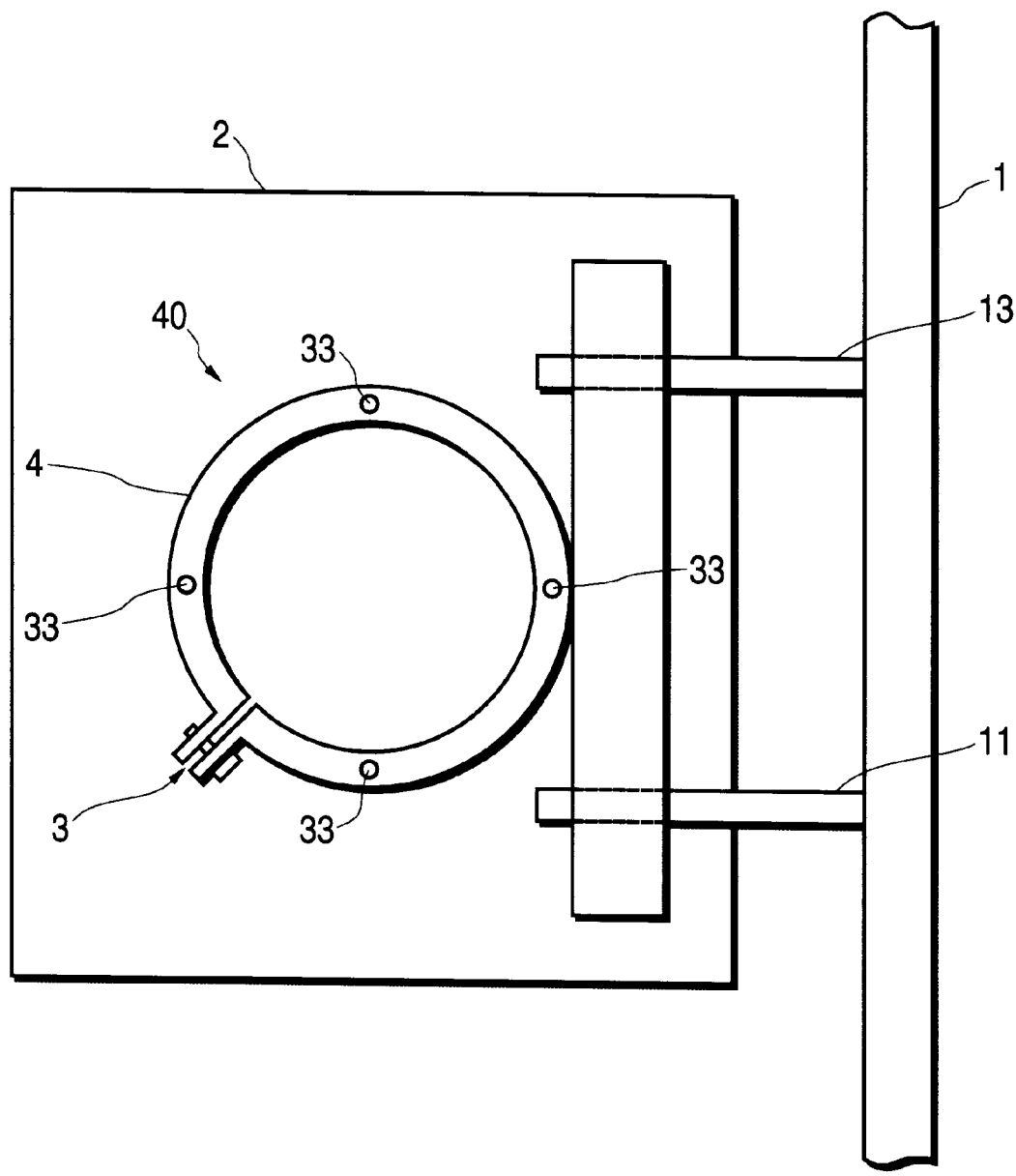
FIG. 4 shows a top view of a temperature control system in accordance with the present invention.

Now referring to FIG. 4, it can be seen that bottle retainer 4 and jacket 3 are disposed so as to form annular area 40 that extends vertically through bottle retainer 4 and jacket 3. Annular area of 40 extends above the top of weighing device 2 and is adapted to receive a bottle. In one embodiment, screws 11 and 13 screw directly into wall 1. Alternatively, screws 11 and 13 screw into fittings designed to receive screws 11 and 13 that are attached to wall 1.

Figure 5:
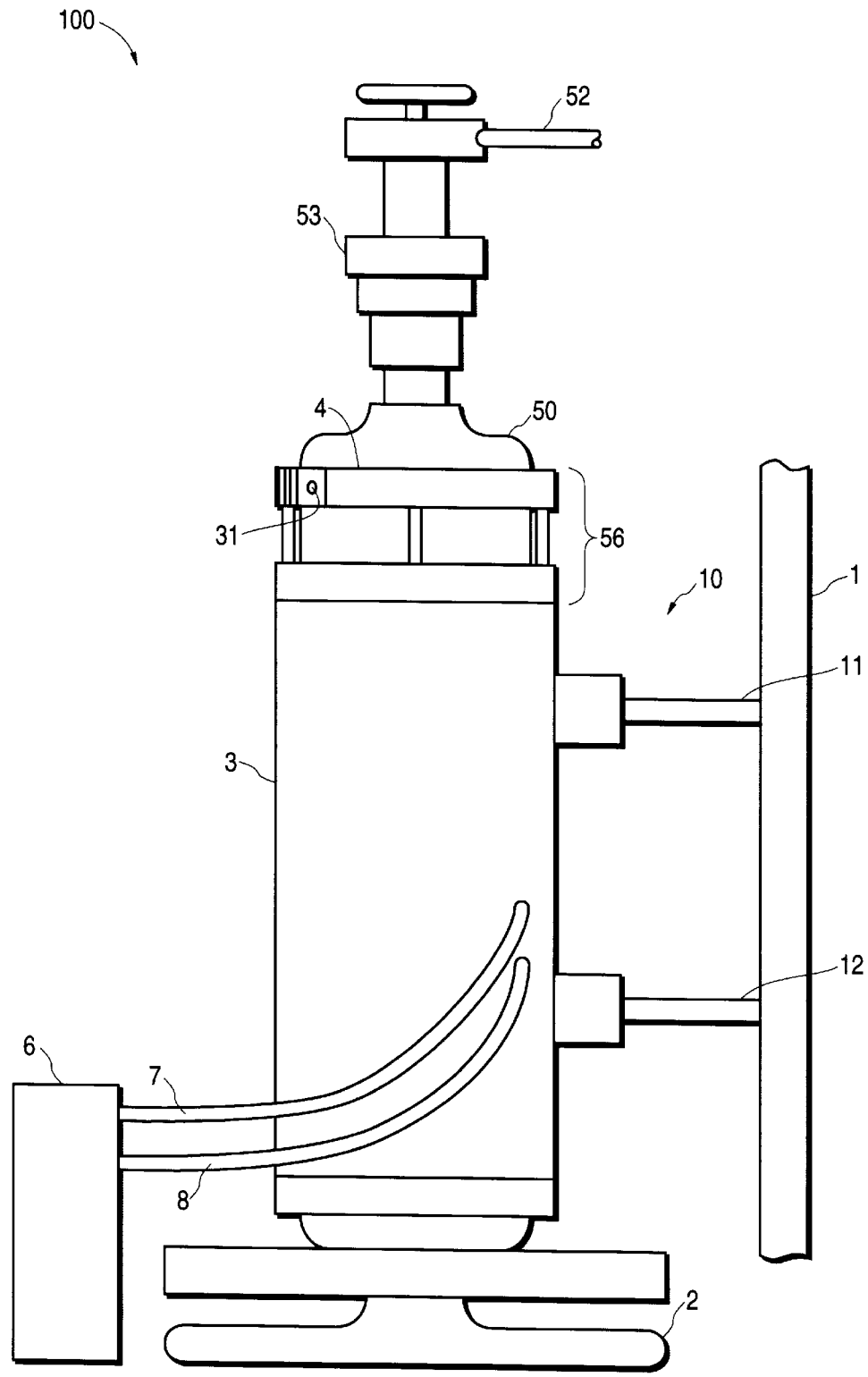
FIG. 5 shows a side view of a bottle disposed in a temperature control system in accordance with the present invention.

FIG. 5 shows bottle 50 inserted into annular area 40 of FIG. 4. In operation, bottle 50 is placed in the annular area 40 such that it rests on weighing device 2. Bolt 31 is then tightened so as to secure bottle retainer 4 to bottle 50. Hardware for connecting bottle 50 to the CVD chamber is then attached to bottle 50. In one embodiment, this hardware includes emergency shut-off device 53 and hose 52. This attachment is much simpler than that of prior art systems since there is no need to strap bottle 50 tightly to the jacket as is required by prior art systems. This results in savings of time and effort in installing and removing bottles.

Continuing with FIG. 5, standard sized bottles have an outer diameter of 6.625 inches. This gives an internal diameter that is 0.052 inches to 0.057 inches larger than the total bottle diameter. The gap between the inner wall of jacket 3 and bottle 50 is sufficiently small so as to allow for effective heat transfer efficiency between jacket 3 and bottle 50. Since bottle 50 is typically made of nickel, good thermal conductivity is established with the chemical disposed therewithin. Good thermal conductivity is also established when the bottle is made of other metals such as, for example, aluminum. The close tolerance allows the bottle 50 to float within jacket 3 as shown by arrow 56 without creating undue drag. This allows for weighing device 2 to accurately determine the weight of the chemical in bottle 50. In particular, weighing device 2 may pick up small changes in weight without the jacket, the cooling lines, and connections to the cabinet wall masking the actual weight as in prior art systems. Though emergency shut-off device 53 and hose 52 do mask the actual weight of bottle 50, the effects are relatively small. This is particularly apparent when compared with the effects of prior art jackets, prior art cooling lines, and prior art connections to the cabinet wall.

Drag is related to the friction coefficient defined by the formula: Friction Coefficient=F/W where F is the force required to move one surface over another and W is the force pressing surfaces together. The larger the friction coefficient, the more drag is noticed. Nickel has a higher Friction Coefficient than aluminum. Therefore, any undue drag noticed between bottle 50 and jacket 3 can be corrected by reducing the friction coefficient. If required, reduction of friction is performed with the use of a lubricant. In one embodiment, a light machine mineral oil is used to change the coefficient of friction. Alternatively, a thin layer of Teflon is added to the inside of the jacket to reduce friction.

Continuing with FIG. 5, the attachment of bottle retainer 4 to bottle 50 prevents rotation of bottle 50 during operation of emergency shut-off device 53. Emergency shut-off device 53 is activated in an emergency for shutting off the gas flow. When emergency shut-off device 53 is activated, the pins engage openings 33 of FIG. 3 so as to prevent bottle retainer 4 and bottle 50 from rotating. This allows emergency shut-off device 53 to effectively shut off the flow of chemicals.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A temperature control system comprising:
   a jacket;
   a temperature control mechanism for controlling the temperature of bottles disposed within said jacket;
   an attachment mechanism for holding said jacket in place over a weighing device;
   a bottle retainer adapted to couple to a bottle; and
   a floating coupling mechanism, said floating coupling mechanism disposed between said bottle retainer and said jacket for coupling said bottle retainer to said jacket.

2. The temperature control system of claim 1 wherein said floating coupling mechanism does not allow said bottle retainer to rotate with respect to said jacket.

3. The temperature control system of claim 2 wherein said floating coupling mechanism further comprises a plurality of openings disposed in said bottle retainer and a plurality of pins coupled to said jacket, said pins aligned with said openings and flotably disposed within said openings such that said bottle retainer floats relative to said jacket.

4. The temperature control system of claim 1 wherein said bottle retainer couples to a bottle by screws that engage the bottle.

5. The temperature control system of claim 1 wherein said bottle retainer is split such that the internal diameter of said bottle retainer is changeable for coupling said bottle retainer to a bottle.

6. The temperature control system of claim 1 wherein said temperature control mechanism further comprises:
   a temperature control device; and
   a plurality of channels disposed within said jacket, said channels adapted to couple to said temperature control device such that liquid may be circulated therebetween.

7. The temperature control system of claim 6 wherein said temperature control device comprises a cooling unit.

8. The temperature control system of claim 7 wherein said temperature control device comprises a heating unit.

9. A temperature control system comprising:
   a jacket;
   a temperature control mechanism for controlling the temperature of bottles disposed within said jacket;
   means for holding said jacket in place over a weighing device;
   a bottle retainer adapted to couple to a bottle; and
   means for coupling said bottle retainer to said jacket such that the weight of said jacket is not imparted to said bottle retainer.

10. The temperature control system of claim 9 wherein said means for coupling said bottle retainer to said jacket does not allow said bottle retainer to rotate with respect to said jacket.

11. The temperature control system of claim 10 wherein said means for coupling said bottle retainer to said jacket comprises a plurality of openings disposed in said bottle retainer and a plurality of pins coupled to said jacket, said pins aligned with said openings and flotably disposed within said openings such that said bottle retainer floats relative to said jacket.

12. The temperature control system of claim 9 wherein said bottle retainer couples to a bottle by screws that engage the bottle.

13. The temperature control system of claim 9 wherein said bottle retainer is split such that the internal diameter is adjustable for coupling said bottle retainer to a bottle.

14. The temperature control system of claim 9 wherein said temperature control mechanism further comprises:
   a temperature control device; and
   a plurality of channels disposed within said jacket, said channels adapted to couple to said temperature control device such that liquid may be circulated therebetween.

15. The temperature control system of claim 14 wherein said temperature control device comprises a cooling unit.

16. The temperature control system of claim 15 wherein said temperature control device comprises a heating unit.

17. A method for controlling the temperature of a bottle such that the weight of said bottle may be determined, said method further comprising:

provideing a jacket adapted to receive a bottle;

providing a bottle retainer adapted to couple to a bottle, said bottle retainer floatably coupled to said jacket;

providing a temperature control mechanism for controlling the temperature of bottles disposed in said jacket; and weighing bottles disposed within said jacket.

18. The method for controlling the temperature of a bottle of claim 17 further comprising the steps of:

providing a weighing device, said weighing device disposed under said jacket.

19. The method for controlling the temperature of a bottle of claim 18 wherein said temperature control mechanism includes:

a temperature control device; and a plurality of channels disposed within said jacket, said channels adapted to couple to said temperature control device such that liquid may be circulated therebetween.

20. The method of controlling the temperature of a bottle of claim 18 further comprising the step of:

providing a floating coupling mechanism disposed between said bottle retainer and said jacket for coupling said bottle retainer to said jacket.

\* \* \* \* \*